April 15, 1958

R. ALBRECHT 2,830,827

COUPLING AND TOWING BAR FOR MOTOR VEHICLES

Filed Jan. 26, 1956

United States Patent Office 2,830,827
Patented Apr. 15, 1958

2,830,827

COUPLING AND TOWING BAR FOR MOTOR VEHICLES

Rüdiger Albrecht, Hamburg-Wandsbek, Germany

Application January 26, 1956, Serial No. 561,588

Claims priority, application Germany December 10, 1955

2 Claims. (Cl. 280—182)

Bars connecting a motor vehicle and a trailer or a helpless vehicle are known in various forms.

The present invention relates to such a coupling bar that makes coupling possible without the two vehicles having to be brought to a certain distance apart.

Figure 1:
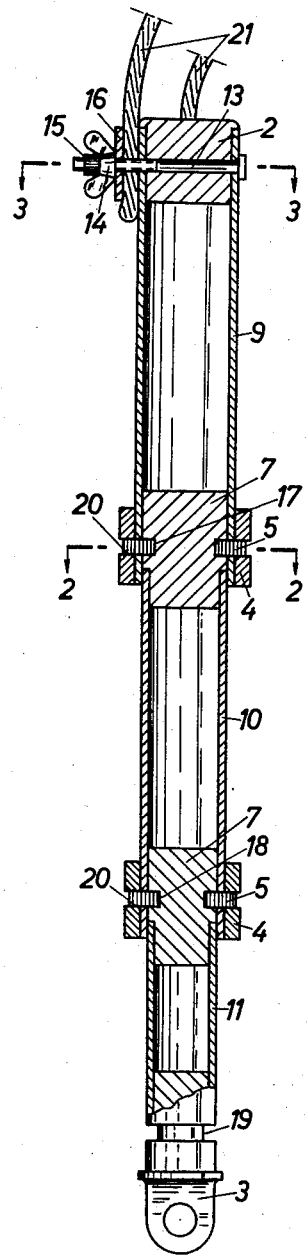
Figure 2:
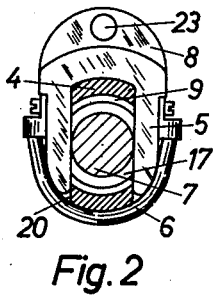
Figure 3:
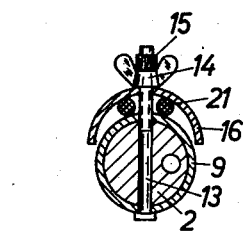
Figure 5:
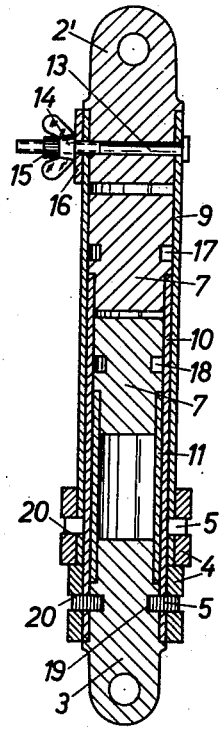
Figure 4:
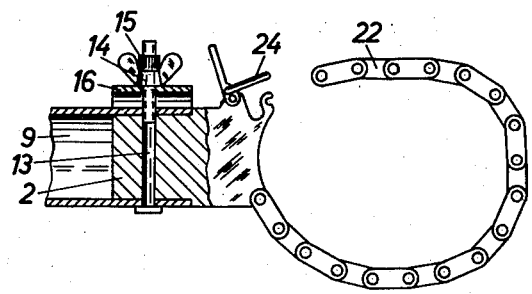

In the accompanying drawings like characters of reference indicate like parts in the several views of the invention that is shown as an example, in which:

Fig. 1 is a longitudinal sectional view of the coupling bar with its parts drawn out ready for use, and in accordance with the invention, Fig. 2 is a sectional view taken on line 2—2 of Fig. 1, Fig. 3 is a sectional view taken on line 3—3 of Fig. 1, Fig. 4 shows in section a second type of arrangement with a hinged chain fitted with a safety lock, Fig. 5 shows in section the coupling bar with its parts telescoped into one another, with the interchangeable coupling eye at one end.

According to the invention the coupling bar comprises three or more tubes (9, 10, 11), of steel or similar material, capable of being telescoped, which can be interlocked by means of the claws 5, but which when drawn out, in spite of their being locked together, are nevertheless free to turn through 360° to each other, especially at their ends 2' and 3, which is of essential importance for the coupling operation.

The upper plug 7 is fixed firmly to tube 10, the lower one to tube 11, so that tubes 10 and 11 can be telescoped into tube 9. In each of the tubes 9 and 10 there are at 5 two opposite slits 20, each extending to about one-quarter of the circumference of the tube and corresponding in their width approximately to the grooves 17 and 18 in plug 7, in which they can be made to fit as shown in Fig. 1, so that when in that position the interlocking of the tubes 9, 10, 11 by the claw 5 follows automatically. The claws 5 grip through the sleeves 4, which are firmly attached to the tubes 9, 10, and the slits 20 into the grooves 17, 18 and finally into 19. Claws 5 are U-shaped (Fig. 2), at the top a handle 8 with an eye 23, the open U-shank below is elastically closed by a spring 6 so that the interlocking of the tubes 9, 10 can be loosened by lifting the claws, in that claws 5 are drawn out of the sleeve 4, and, for example, deposited on the drawn-out tubes. When the claws 5 are in the position shown in Fig. 5, the spring 6 causes them to engage automatically as shown in Fig. 1 when the tubes 9 and 10 are drawn apart.

As shown in Fig. 5, the lower part 3 that carries the coupling eye can also be interchanged by drawing it out with the help of claw 5.

The coupling cable 21 is firmly connected at one end to the part 2, which is held in tube 9 by the threaded bolt of square cross section 13. Bolt 13 carries the wing nut 14 with lock nut 15 (with knurled outer surface) and under it the clamping clip 16 (Figs. 1 and 3).

Instead of a cable 21 a hinged chain 22 with safety fastening 24 can be used (Fig. 4). It serves in particular for the coupling up to round vehicle parts such as axles or axle necks.

The coupling bar in accordance with the invention is adjustable for different distances; the maximum length is shown in Fig. 1, the minimum length in Fig. 5, an intermediate length is attained if 10 or 11 is drawn out of part 9 or part 10 respectively, and that position then locked with the claws 5 which locking occurs automatically.

What I claim is:

1. A towing and coupling device comprising an elongated outer tubular member and an elongated inner member telescopically slidable in said outer member, coupling means on one end of said inner member, means defining a first annular groove in an end portion of said inner member adjacent said coupling means, means defining a second annular groove in the opposite end portion of said inner member, means defining transverse slots in opposite sides of the end portion of said outer member nearest said coupling means, a U-shaped claw member having opposite leg portions slidable in said slots for movement inwardly into engagement in opposite portions of a selected one of said annular grooves, means biasing said claw member inwardly, said claw member being outwardly retractible to disengage said claw member from said inner member to permit longitudinal movement of said inner and outer members relative to one another and being movable inwardly by said biasing means to engage selectively said first and second annular grooves respectively and thereby lock said member against longitudinal movement in a shortened position and also in an extended position while permitting relative rotary movement of said members through 360° in all positions.

2. A towing and coupling device according to claim 1, in which said biasing means comprises a spring connected between the legs of said U-shaped claw member and engaging an intervening portion of said outer member.

References Cited in the file of this patent

UNITED STATES PATENTS

| 1,536,751 | Barnes | May 5, 1925 |
| 2,357,540 | Palmer | Sept. 5, 1944 |

FOREIGN PATENTS

| 445,103 | Germany | May 31, 1927 |